United States Patent [19]
Doshi

[11] Patent Number: 6,048,017
[45] Date of Patent: Apr. 11, 2000

[54] LINER HAVING ENHANCED FRICTIONAL CHARACTERISTICS

[75] Inventor: Satish J. Doshi, Grand Blanc, Mich.

[73] Assignee: Durakon Industries, Inc., Lapeer, Mich.

[21] Appl. No.: 08/961,113

[22] Filed: Oct. 30, 1997

[51] Int. Cl.$^7$ .................................................. B60R 13/01
[52] U.S. Cl. ........................................ 296/39.2; 296/39.1
[58] Field of Search ............................... 296/39.1, 39.2, 296/97.23; 105/423

[56] References Cited

U.S. PATENT DOCUMENTS

| | | | |
|---|---|---|---|
| Re. 32,198 | 7/1986 | Wayne | 296/39 |
| 3,605,166 | 9/1971 | Chen | 296/97.23 X |
| 4,161,335 | 7/1979 | Nix et al. | 296/39.2 |
| 4,162,098 | 7/1979 | Richardson, III | 296/39.2 |
| 4,885,201 | 12/1989 | Brandt | 428/143 |
| 4,887,947 | 12/1989 | Bott | 410/144 |
| 4,944,612 | 7/1990 | Abstetar et al. | 296/39.2 |
| 4,958,876 | 9/1990 | Diaco et al. | 296/39.2 |
| 5,370,436 | 12/1994 | Martindale et al. | 296/39.2 |
| 5,597,194 | 1/1997 | Daugherty et al. | 296/39.2 |
| 5,599,055 | 2/1997 | Brown | 296/39.2 |
| 5,648,031 | 7/1997 | Sturtevant et al. | 264/80 |
| 5,695,235 | 12/1997 | Martindale et al. | 296/39.2 |
| 5,803,531 | 9/1998 | Nielsen | 296/184 |
| 5,887,931 | 3/1999 | Bills et al. | 296/39.2 X |
| 5,889,519 | 5/1999 | Doshi | 296/39.2 |

*Primary Examiner*—D. Glenn Dayoan
*Assistant Examiner*—Jason Morrow
*Attorney, Agent, or Firm*—Brinks Hofer Gilson & Lione

[57] ABSTRACT

A liner for installation in the bed of a pickup truck or cargo vehicle includes a bottom panel bounded by vertical walls and a friction enhancing material secured to the upper surface of the bottom panel. The material is preferably an open mesh fabric or webbing which may be woven but is preferably extruded in order to ensure bonding of threads or filaments at their intersections. Preferably, as well, as the webbing is made of material similar to the material of the bed liner which is typically high density polyethylene (HDPE) in order that appropriate autogenous bonding between the liner and mesh may be achieved and furthermore that the liner, mesh and manufacturing scrap may be readily recycled.

20 Claims, 3 Drawing Sheets

LINER HAVING ENHANCED FRICTIONAL CHARACTERISTICS

BACKGROUND OF THE INVENTION

The invention relates generally to liners for pickup trucks, cargo vehicles and the like and more particularly to a liner having a cargo supporting surface with enhanced frictional characteristics.

Liners for motor vehicles, particularly bed liners for pickup trucks and other cargo carrying vehicles provide many benefits when used in conjunction with conventional metal pickup truck and cargo vehicle beds.

Firstly, bed liners provide a resilient barrier between the cargo area and the actual truck bed which absorbs energy and reduces denting and damage to the bed liner when heavy loads are placed in the vehicle bed. Such protection extends not only to dents and dings but also to superficial damage such as scratches and abrasion of the paint.

Second, since the bed liner also resides between ambient conditions and the truck bed and provides a generally impervious barrier therebetween, it protects it from water, salt and other possibly more corrosive material which may be carried in and damage the truck bed.

Additionally should such a bed liner become damaged, it may readily be replaced at a cost small relative to the cost of new metal truck bed.

A final benefit conferred upon such vehicles by bed liners is the increased value at resale. A truck having a bed protected by a bed liner throughout its life returns a significantly higher percentage of its original cost to the owner than do trucks without such protection.

Such bed liners are typically fabricated of rugged and durable material which includes a relatively smooth upper surface which may exhibit a relatively low coefficient of friction. In such instances, cargo placed on such a bed liner may move about somewhat more readily than is desirable. Many solutions to this situation have been offered. For example, in U.S. Pat. No. 4,958,876 a plurality of vertical channels formed in the liner sidewalls are adapted to receive cross members which secure loads against longitudinal movement. U.S. Pat. No. 4,887,947 also discloses a bed liner having a plurality of vertically foreshortened ribs and channels which also receive cargo restraining members. Both of these approaches require additional components to secure the load and neither provides significant transverse cargo restraint.

Another approach is disclosed in U.S. Pat. No. 5,648,031 to Sturtevant and Cullivan. In this patent, the horizontal surface of the bed liner is sprayed with a friction enhancing material which provides a surface with an increased coefficient of friction and a bed liner which provides this feature without ancillary components.

The foregoing review of certain prior art patents reveals that improvements in the art of bed liners having friction enhanced surfaces are both possible and desirable.

SUMMARY OF THE INVENTION

A liner for installation in the bed of a pickup truck or cargo vehicle includes a bottom panel bounded by vertical walls and a friction enhancing material secured to the upper surface of the bottom panel. The material is preferably an open mesh fabric or webbing which may be woven but is preferably extruded in order to ensure bonding of threads or filaments at their intersections. Preferably, as well, as the webbing is made of material similar to the material of the bed liner which is typically high density polyethylene (HDPE) in order that appropriate autogenous bonding between the liner and the mesh may be achieved and furthermore that the liner, mesh and manufacturing scrap may be readily recycled.

Thus it is an object of the present invention to provide a bed liner having enhanced frictional characteristics.

It is a further object of the present invention to provide a bed liner having a web or mesh secured by a taught and responding to the upper surface of the bottom of the bed liner.

It is a still further object of the present invention to provide a bed liner with a web secured to its bottom panel which is fabricated of a material similar to that from which the bed liner is fabricated.

Further objects and advantages of the present invention will become apparent by reference to the following specification and appended drawings where in like reference numbers refer to the same component, element, or feature.

DESCRIPTION OF THE PREFERRED AND ALTERNATE EMBODIMENTS

Figure 1:
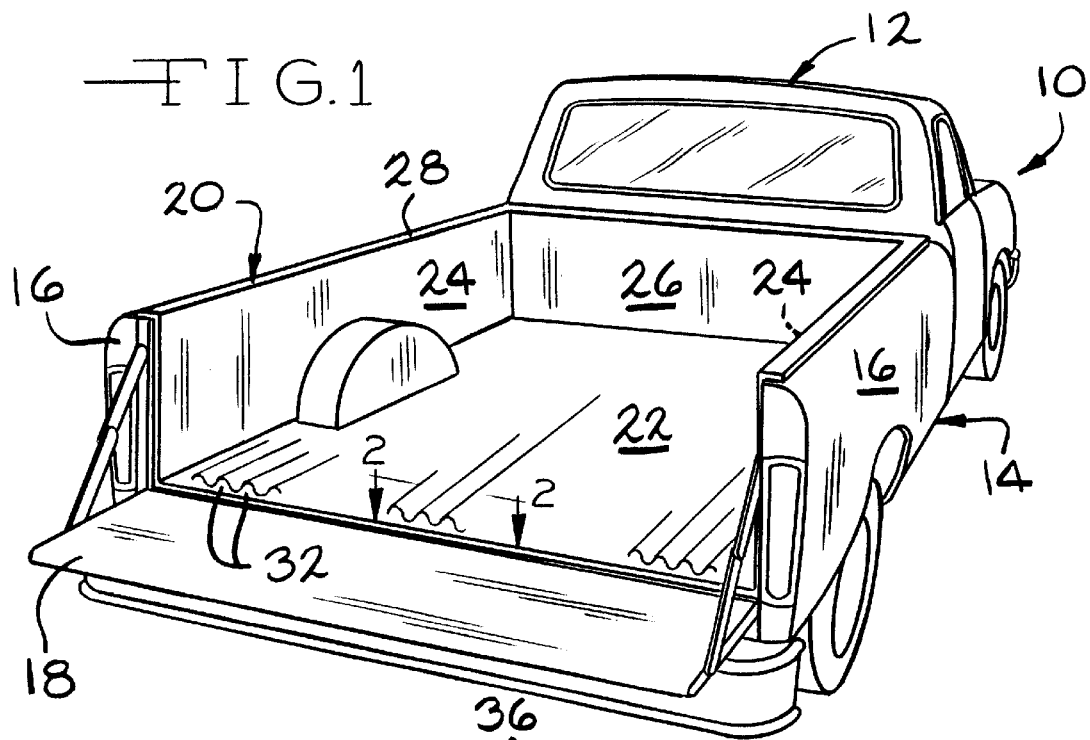
FIG. 1 is a perspective view of a pickup truck and bed having a bed liner incorporating the present invention.

Referring now to FIG. 1, a pickup truck designated by the reference number 10 is illustrated. The pickup truck 10 is conventional and includes a cab 12 and a bed or box 14 having a transversely and horizontally pivoted tailgate 18. Disposed in the box 14 of the pickup truck 10 is a bed liner 20 according to the present invention which generally conforms to the overall shape of the box 14. As such, the bed liner 20 includes a bottom or bottom panel 22 having a non-skid or friction enhanced surface according to the present invention, a pair of longitudinally extending sidewalls 24 and a front wall 26. The bed liner 20 may or may not include an upper rail 28 which extends along the top of the sidewall 16 of the box 14 if it is of the type designated as an overrail bed liner. It is of the type designated underrail, the upper rail 28 will be omitted.

Preferably, the bottom panel 22 of the bed liner 20 which extends substantially completely across the horizontal surface of the truck box 14 includes corrugations 32 which are longitudinal, uniform undulations of the lower surface of the bed liner 20 which may or may not generally correspond to similar undulations (not illustrated) in the bottom panel of the truck box 14. Preferably, the bed liner 20 is fabricated of a dense plastic material such as high density polyethylene (HDPE) or similar rugged and relatively temperature stable material.

Figure 2:
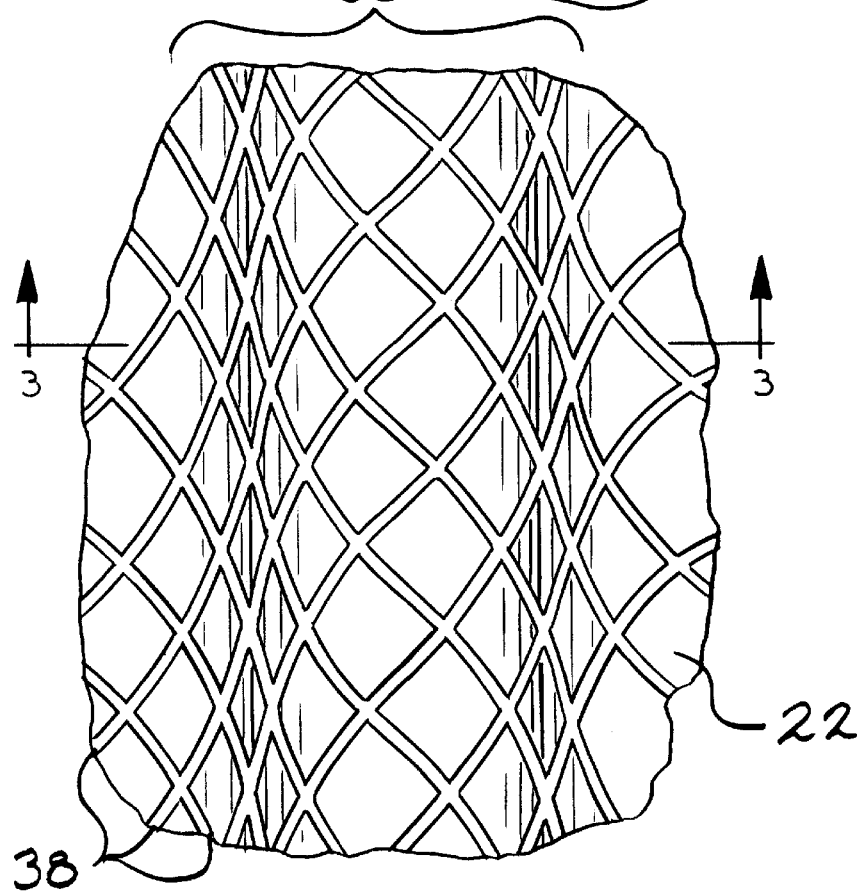
FIG. 2 is a fragmentary, enlarged, top plan view of a bed liner having enhanced frictional characteristics according to the present invention taken along line 2—2 of FIG. 1.

To the upper surface of the bottom panel 22 of the bed liner 20 is affixed by autogenous bonding or similar intimate bonding technique, a webbing or mesh fabric 36. The webbing or mesh fabric 36 may be a woven material but is preferably an extruded mesh such that, as illustrated in FIG. 2, each of the junctions or intersections of the individual filaments 38 is intimately bonded together such that pantographing of the webbing or mesh is controlled and further that the integrity of the mesh or web 36 and its individual filaments 38 is enhanced since any unsecured or unsupported free length of one of the filaments 38 of the mesh or web 36 is minimized due to the connections achieved at every intersection of each of the filaments 38. As used here, the term pantographing refers to the tendency or ability of panels of conventional woven material to distort and collapse like a pantograph when parallel sides of the panel are alternatively pulled or skewed.

Figure 3:
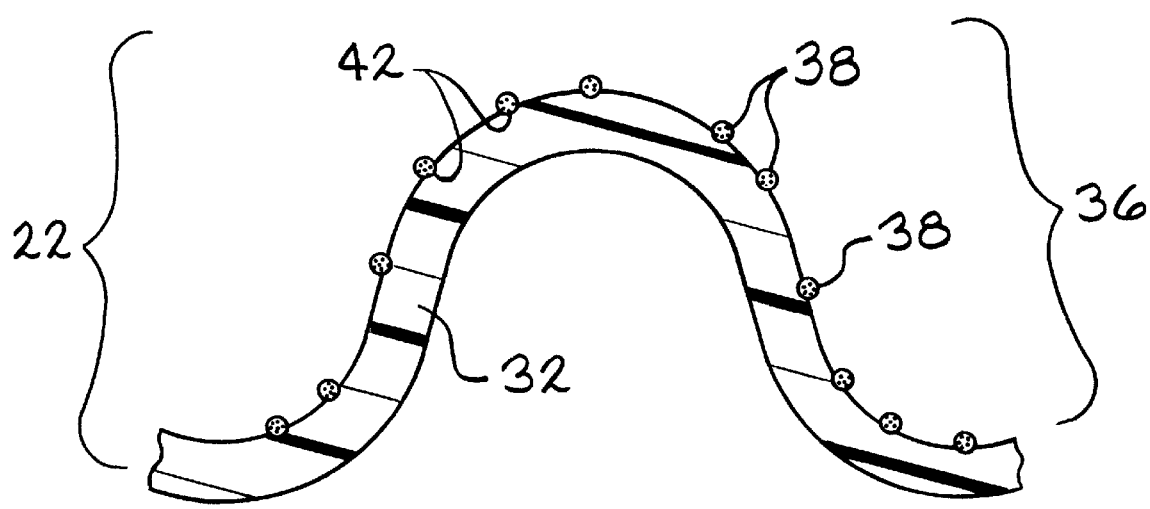
FIG. 3 is a greatly enlarged, fragmentary, sectional view of a bed liner having enhanced frictional characteristics according to the present invention taken along line 3—3 of FIG. 2.

As illustrated in FIGS. 2 and 3, the mesh or web 36 is intimately bonded to and thus closely conforms to the convolutions 32 of the bottom panel 22 of the bed liner 20. Such intimate bonding and conformity may be achieved either by securing the web or mesh 36 to the bottom panel 22 just subsequent to its initial production as a flat sheet (typically through an extrusion process) by subjecting the flat sheet and mesh 36 to compressive forces between parallel planar surfaces before it has fully cooled. Alternatively, the bottom panel 22 and mesh 36 may be secured together after the bed liner 20 has been flame treated and during the forming process of the bed liner 20 when the extruded flat panel which will be formed into the bed liner 20 is heated, placed in a mold and then vacuum formed.

In either event, the filaments 38 of the web or mesh 36 are preferably partially, that is, between thirty and sixty percent on a height or diametral basis pressed or submerged into the bottom panel 22 of the bed liner 20 such that not only are they intimately bonded but they form complementarily configured semicircular channels 42 in the material of the bottom panel 22 which mechanically hold and position the filaments 38 as will be readily appreciated. The formation of the channels 42 and the intimate bonding due to the homogeneous or similar nature of the materials of the filaments 38 and the bottom panel 22 of the bed liner 20 greatly enhances the ruggedness of the filaments 38 thereby improving the service life and increased frictional coefficient of the bottom panel 22 of the bed liner 20.

The material from which the web or mesh 36 is fabricated may be a blend of polyethylene (both homopolymer and copolymers) and polypropylene having a melt temperature of approximately 195° Fahrenheit (91° C.) and a specific gravity in the range from about 0.87 to 0.93. A specific gravity of 0.9 is considered optimum. It should be appreciated that these ranges may vary depending on the composition of the bed liner 20 to which the mesh 36 is secured and that generally the competing considerations that the mesh or fabric 36 be of a density and exhibit a melting temperature high enough that it is never damaged in the ambient but low enough that good bonding occurs between it and the bed liner 20 and further that the material is rugged enough to withstand the service in a bed liner 20 to which it will be subjected but, again, soft enough to properly adhere to the bottom panel 22 of the bed liner 20. Such polyethylenes are included in a general class of products designated by the trade name Flexomer manufactured by the Union Carbide Company and designated by the trade name Engage manufactured by the du Pont-Dow Elastomers Company. Flexomer type UC1085NT from Union Carbide Company and Engage type 8480 have been found to be particularly satisfactory constituents of the web or mesh 36. Other similar products such as Exact from Exxon Chemical Co., Affinity from Dow Chemical Co. and various polypropylenes sold under such names as Profax, Esconene and Rexene are also suitable.

Figure 4:
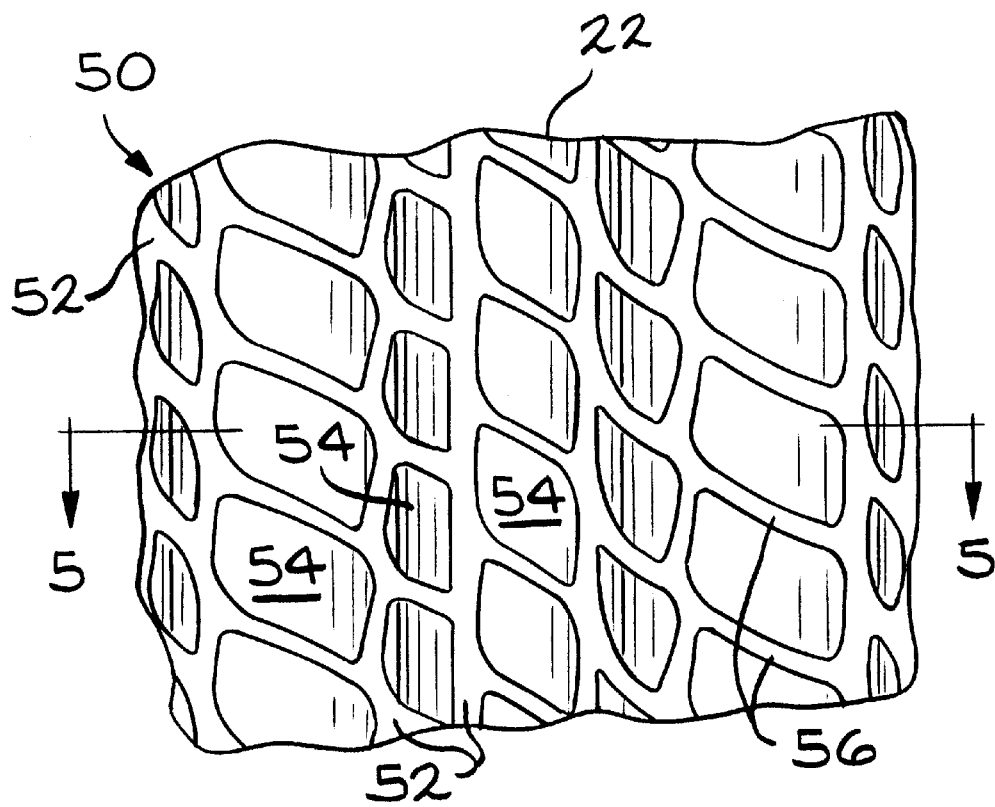
FIG. 4 is an enlarged, fragmentary, top plan view of a first alternate embodiment bed liner having enhanced frictional characteristics according to the present invention.
Figure 5:
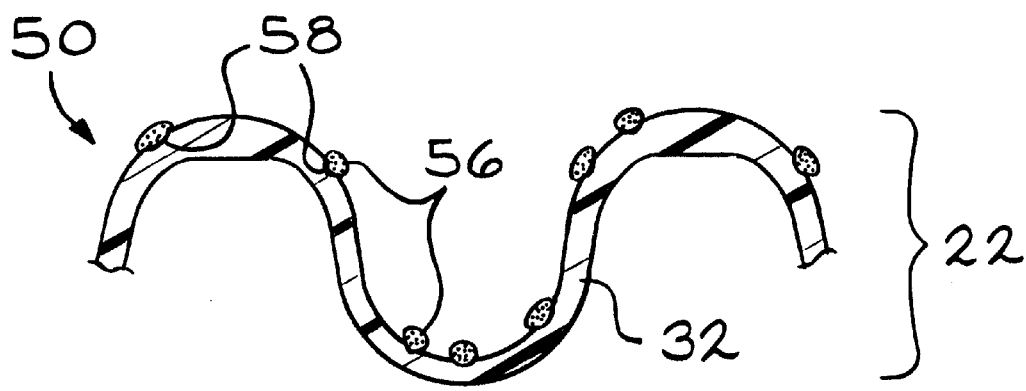
FIG. 5 is a greatly enlarged, fragmentary, sectional view of a first alternate embodiment bed liner having enhanced frictional characteristics according to the present invention.

Referring now to FIGS. 4 and 5, a first alternate embodiment non-skid or friction enhanced surface 50 for the convolutions 32 of the bottom panel 22 of a bed liner 20 is illustrated. The first alternate embodiment friction enhanced surface 50 includes a mesh fabric 52 having essentially rectangular interstices 54 which is fabricated of a similar composition polyethylene and polypropylene as described above with regard to the preferred embodiment. The fabrication of the enhanced friction bed liner surface 50 is also similar in that the mesh 52 may be secured to the flat, extruded panel upon its exit from an extruding machine and before it is cooled or the mesh 52 may be disposed upon the top surface of the panel of extruded material after it has been flame treated but before it is vacuum formed into the bed liner 20. In either event, the bottom panel 22 of the bed liner 20 and the filaments 56 of the mesh fabric 52 will be pressed or pushed into the upper surface of corrugations 32 of the bed liner bottom panel 22 such that they are both intimately bonded and mechanically restrained therein.

The following Table I sets forth various examples of the increase in the coefficient of friction achieved by the friction enhancing mesh applied to the upper surface of a bed liner relative to a conventional (standard) bed liner surface and a variety of similar products. Table I presents data representing the angle of incline, in degrees, of a sample bed liner surface according to the present invention at which motion of test blocks of various sizes, weight and materials on their lower (contacting) surfaces commences motion.

TABLE I

| Material | Sample | | | | | |
| --- | --- | --- | --- | --- | --- | --- |
| | A | B | C | D | E | F |
| Steel | 9.2 | 15.2 | 17.4 | 31.2 | 27.0 | 17.0 |
| Aluminum | 11.2 | 25.2 | 27.4 | 22.6 | 22.8 | 20.4 |
| Plywood | 9.6 | 25.4 | 29.8 | 28.2 | 26.4 | 22.4 |
| Wood | 21.8 | 35.8 | 37.8 | 30.8 | 28.2 | 26.0 |
| Leather | 14.2 | 23.8 | 32.4 | 32.2 | 36.4 | 27.8 |
| Cardboard | 15.6 | 31.2 | 33.4 | 32.4 | 26.4 | 28.8 |

The significance of the data presented is primarily comparative and such comparisons are most meaningfully made with regard to those figures residing in a given horizontal row. Also, the specifications of the various test blocks are distinct and are herewith provided: Steel—3¾ inch (95.3 mm) disc weighing 1.8 pounds (817.2 gm); Aluminum—a 3¾ inch (95.3 mm) disc weighing 1.135 pounds (515.3 gm); Plywood—4 inch (101.6 mm) square of fir plywood 1½ inch thick weighing 0.445 pounds (202 gm); Wood—4 inch (101.6 mm) square of 1 inch thick jelutong; Leather—4 inch (101.6 mm) square of hide secured to a wood block; and Cardboard—4 inch (101.6 mm) square of corrugated cardboard.

Particularly meaningful comparison can be made between the data of column A and columns D or E and columns D or E and column F. Note, for example, that on the standard textured flat sheet HDPE of bed liner material of Column A, the steel test block begins to move at 9.2° whereas on corrugated HDPE bed liner material incorporating the present invention, presented in columns D or E, movement of the same steel test block does not begin until the sample is raised to angles of 31.2° and 27°, respectively. Similarly, the fir plywood test block which begins to move when Sample A is inclined to an angle of 9.6° does not begin to move on Samples D and E until they are inclined to an angle of 28.2° and 26.4° respectively. The improvements in the frictional characteristics of bed liners incorporating the present invention with regard to other materials are also significant. Hence, bed liners and other, similar liners for cargo vans, vehicles and trucks incorporating the present invention exhibit significantly improved frictional characteristics which reduce both longitudinal and transverse cargo movement.

One of the significant additional benefits of a bed liner 20 of the preferred or alternate construction is its recyclability. Both manufacturing scrap and old, discarded bed liners can be readily ground up and reused as appropriate due to the highly homologous nature of the plastics from which it and the web or mesh are fabricated.

The foregoing disclosure is the best mode devised by the inventors for practicing this invention. It is apparent, however, that apparatus incorporating modifications and variations will be obvious to one skilled in the art of cargo vehicle liners. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A liner for a cargo vehicle having a surface with enhanced frictional characteristics comprising, in combination, a sheet substrate of a first material adapted to generally conform to the cargo area of a vehicle and having a surface generally conforming to the cargo area surface of the vehicle, and a mesh of a second material distinct from said first material and disposed on said surface of said sheet substrate, said mesh including a plurality of filaments integrally bonded to said surface of said substrate.

2. The cargo vehicle liner of claim 1 wherein said sheet substrate includes a plurality of parallel convolutions.

3. The cargo vehicle liner of claim 1 wherein said mesh is extruded mesh.

4. The cargo vehicle liner of claim 1 wherein said mesh includes filament intersections and bonds between said filaments at said filament intersections.

5. The cargo vehicle liner of claim 1 wherein said sheet substrate is high density polyethylene and said mesh includes polyethylene.

6. The cargo vehicle liner of claim 1 wherein said filaments of said mesh are substantially continuously bonded to said surface of said sheet substrate.

7. The cargo vehicle liner of claim 1 wherein said filaments form recesses in said surface of said sheet substrate to assist retention of said filaments on said sheet substrate.

8. A liner for a cargo vehicle having a surface with enhanced frictional characteristics comprising, in combination, a sheet substrate of a first material adapted to conform generally to the cargo area of a vehicle and having a convoluted surface generally conforming to the cargo area surface of the vehicle, and a mesh of a second material distinct from said first material and disposed on said convoluted surface of said sheet substrate, said mesh including a plurality of filaments integrally bonded to said convoluted surface of said sheet substrate.

9. The liner for a cargo vehicle of claim 8 wherein said convolutions are parallel.

10. The liner for a cargo vehicle of claim 8 wherein said mesh is extruded mesh.

11. The liner for a cargo vehicle of claim 8 wherein said mesh includes filament intersections and bonds between said filaments at said filament intersections.

12. The liner for a cargo vehicle of claim 8 wherein said sheet substrate is high density polyethylene and said mesh includes polyethylene.

13. The liner for a cargo vehicle of claim 8 wherein said filaments of said mesh are substantially continuously bonded to said surface of said sheet substrate.

14. The liner for a cargo vehicle of claim 8 wherein said filaments form recesses in said surface of said sheet substrate to assist retention of said filaments on said sheet substrate.

15. A liner for a cargo vehicle having a surface with enhanced frictional characteristics comprising, in combination, a substantially non-porous substrate of a first material adapted to conform generally to the cargo area of a vehicle, said substrate having a bottom panel bounded by sidewalls, said bottom panel including corrugations and generally conforming to the cargo area surface of the vehicle, and a mesh of a second material distinct from said first material disposed on said surface of said convoluted bottom panel of said substrate, said mesh including a plurality of filaments substantially continuously bonded to said surface of said convoluted bottom panel.

16. The liner for a cargo vehicle of claim 15 wherein said mesh is extruded mesh.

17. The liner for a cargo vehicle of claim 15 wherein said mesh includes filament intersections and bonds between said filaments at said filament intersections.

18. The liner for a cargo vehicle of claim 15 wherein said substantially non-porous substrate is high density polyethylene and said mesh includes polyethylene.

19. The liner for a cargo vehicle of claim 15 wherein said filaments of said mesh are arranged to define intersections and said filaments are bonded to one another and to said substantially non-porous substrate at said intersections.

20. The liner for a cargo vehicle of claim 15 wherein said filaments form recesses in the surface of said non-porous substrate to assist retention of said filaments on said non-porous substrate.

* * * * *